F. T. GROGAN.
Saw-Gage.
No. 198,458. Patented Dec. 25, 1877.
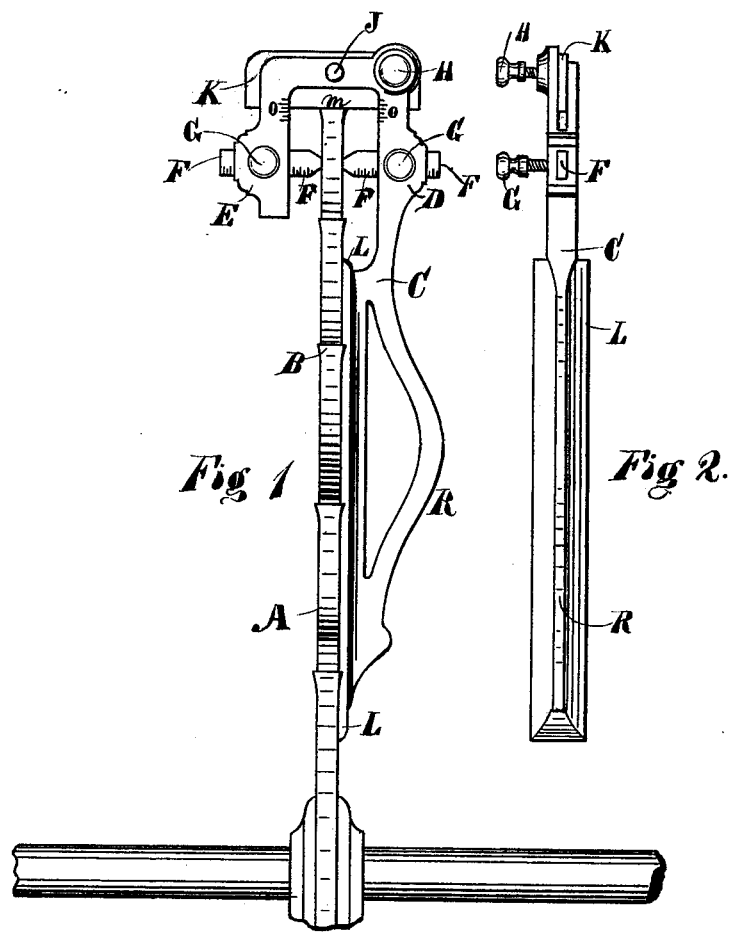

UNITED STATES PATENT OFFICE.

FRANCIS T. GROGAN, OF INDIANAPOLIS, INDIANA.

IMPROVEMENT IN SAW-GAGES.

Specification forming part of Letters Patent No. 198,458, dated December 25, 1877; application filed September 17, 1877.

*To all whom it may concern:*

Be it known that I, FRANCIS T. GROGAN, of Indianapolis, in the county of Marion and State of Indiana, have invented a new and useful Improvement in Saw-Gages, which improvement is fully set forth in the following specification and accompanying drawing, in which—

Figure 1 represents an edge view of a saw, showing a side view of my improved gage applied thereto; and Fig. 2 represents an edge view of the gage.

The object of my invention is to furnish a device by which any irregularity in the points of the teeth of a saw can be determined, so that the same can be afterward trued up and brought into line with the sides of the saw, and to furnish a means of gaging the points of the teeth, so that they may be dressed perfectly square on their extreme points, as at any required angle with the line of direction of the saw.

My invention consists of a straight-edge having an inverted L-shaped upper end, in which are inserted adjustable gages, which will be hereinafter fully described.

In swaging the points of saw-teeth they are likely to be driven or bent to one side or to the other of their proper set, and the angle of their points changed from the line of the saw.

By means of my invention I can determine or gage the proper set of the teeth and the required angle of their points with the line of direction of the saw.

In the drawings, A represents the saw, and B the points of the teeth. The straight-edge of the gage is represented at L L, and is strengthened by the rib or curved back R. At the upper end of the straight-edge L the rib R forms the neck C, which extends upward, and also forms an inverted L-shaped frame, in which the adjustable gage-plates are inserted in the manner shown, as follows:

The sliding gages F F are inserted in slots formed in the opposite sides of the upper frame, and are designed to be adjusted so as to touch each side of the points of the saw-teeth when the straight-edge L is applied to one side or the other of the saw. These gages may be graduated so as to determine the thickness of the saw, and to determine the width of the points of the teeth, and to indicate the amount of metal on either side of the point of the teeth that has to be dressed off, in order that the points of all the teeth shall be of the same width, and also to indicate any spring or bend of the teeth that may be out of line with the body of the saw, that may be caused by swaging or otherwise. The extreme upper end of the gage has a slot cut therein transversely, in which the gage-plate K is inserted and pivoted at J. The lower edge m may be adjusted at right angles to the line of the saw, for the purpose of determining whether the points of the teeth are perfectly square; or the gage K may be adjusted to any desired angle to the line of the saw, as indicated by the marks O O on the side of the gage-frame, when the points of alternate teeth are to be dressed at opposite angles to the line of the saw, for the purpose of determining whether the angles thereof are all the same.

The binding-screw H is designed to hold the gage K securely at any angle desired, and the binding-screws G G also allow the side gages F F to also be adjusted and firmly secured in any required position.

It will be seen from the foregoing that when my improved gage is used on saws of any kind any irregularity of the teeth will at once be detected. If the teeth are bent out of line with the body of the saw from any cause, the side gages F F show which way and how much they are to be bent in order to straighten them up. If the points of the teeth are not swaged wide enough, the same gages show it, and the proper remedy must be applied. If they are swaged so as to be too wide at the point, they must be dressed off on the proper side or sides, so as to allow the sides of the points to just pass between the ends of the gages F F. If the extreme points of the teeth are not at the required angle, then they must be dressed to correspond with the angle given to the gage-plate K. In all cases the straight-edge L must lie flat against the side of the saw, and when the alternate points of the teeth are to be dressed at an angle to the line of the saw, then the straight-edge should be applied to alternate sides of the saw, to indicate the proper angle of each alternate tooth.

What I claim as new, and wish to secure by Letters Patent, is—

1. In combination with a saw-gage frame constructed in the manner described, the side gage-plates F F and the top gage K, pivoted at J, the gages to be secured by binding-screws H and G, in the manner and for the purpose described.

2. The gage-frame constructed with a straight-edge, L L, having its upper end formed like an inverted L, and adapted to receive a top adjustably-pivoted gage-plate, K, and side gage-plates F F, or their equivalent, (screws,) in the manner set forth and described.

In testimony whereof I have signed my name to this specification in the presence of two subscribing witnesses.

FRANCIS T. GROGAN.

Witnesses:
E. O. FRINK,
S. C. FRINK.